United States Patent [19]

Delatorre

[11] Patent Number: 4,870,536
[45] Date of Patent: Sep. 26, 1989

[54] MICRO DISPLACEMENT FORCE TRANSDUCER

[75] Inventor: Leroy C. Delatorre, Sugar Land, Tex.
[73] Assignee: Panex Corporation, Sugar Land, Tex.
[21] Appl. No.: 244,043
[22] Filed: Sep. 14, 1988

Related U.S. Application Data

[62] Division of Ser. No. 145,373, Jan. 19, 1988.

[51] Int. Cl.⁴ .......................... G01L 9/10; G01L 7/04
[52] U.S. Cl. ....................................... 361/283; 73/735
[58] Field of Search ................. 73/718, 724, 708, 735; 361/283

[56] References Cited

U.S. PATENT DOCUMENTS

| | | | |
|---|---|---|---|
| 3,479,879 | 11/1969 | Music | 361/283 |
| 4,301,492 | 11/1981 | Pacquin | 73/724 |
| 4,388,833 | 6/1983 | Kuwayama | 73/724 |
| 4,507,972 | 4/1985 | Morita | 73/708 |
| 4,523,474 | 6/1985 | Browne | 73/724 |
| 4,691,574 | 9/1987 | Delatorre | 73/724 |
| 4,738,141 | 4/1988 | Kas | 73/735 |
| 4,741,214 | 5/1988 | Vidmantas | 73/724 |

Primary Examiner—Donald A. Griffin

[57] ABSTRACT

A sensor system utilizing a Bourdon tube to generate a force as a function of pressure to deflect a diaphragm in a capacitor device where the diaphragm varies capacitance values of the capacitor device as a function of the applied force. The capacitor device is an essentially integral circularly shaped construction of quartz material in which the diaphragm is attached to a tubular quartz member. A metal member having a similar coefficient of temperature expansion to the coefficient of the quartz is used to couple the diaphragm to the Bourdon tube.

14 Claims, 4 Drawing Sheets

MICRO DISPLACEMENT FORCE TRANSDUCER

This is a divisional of co-pending application Ser. No. 145,373 filed on Jan. 19, 1988, pending.

FIELD OF THE INVENTION

This invention relates to transducers, and more particularly to a micro displacement force transducer utilizing a quartz diaphragm with controlled micro displacement for obtaining precise displacement measurements caused by a force applied to the diaphragm.

BACKGROUND OF THE INVENTION

In U.S. Pat. No. 4,091,683 issued May 10, 1987, a system for downhole measurement of pressure is disclosed in which an interrelated capacitance device can be used in a transducer for measuring pressure. In U.S. Pat. No. 4,322,775 issued Mar. 30, 1982, a sensor or transducer construction is disclosed in which the measurements of two capacitors in a sensor construction are obtained and where there is a compensation for the effects of gravity and temperature. In U.S. Pat. No. 4,624,136 issued on Nov. 25, 1986, a typical downhole oil field tool for measuring pressures and temperatures is disclosed.

While the present invention has a wider application, one of the critical areas of concern to the evaluation of oil field reservoirs involves the determination of downhole pressure and temperature in a well bore. For this reason, pressure and temperature measurements are taken during actual drilling operations in procedures called "drill stem tests". Also, after a well is completed it is a common occurrence to measure the downhole pressure and temperature over a period of time for "production tests". In oil field applications, therefore, measurement of pressure and temperature is an important factor and is made even more important in that the accuracy of the pressure measurement can be a significant factor in determining the extent of oil reserves available from underground production. The extent of oil reserves is an asset and thus precise pressure measurements are necessary for accurate asset evaluations. Precise pressure measurements, in turn, are a function of the transducer reliability, repeatability and accuracy.

Oil field practices, being what they are, cause equipment containing one or more pressure transducers to be subjected to rough treatment which translates into shock loading for transducers and other instrumentation in a well tool. It is not uncommon for a tool to be dropped at the earth's surface, in a shop, at a well site or transported at a haphazard speed into or out of the well bore. In some operations it is sometimes possible to have the pressure and temperature tool connected in a system where a shaped charged perforator or other explosive device is detonated in the well bore. Thus, the pressure and temperature measuring tool can be subject to moderate to severe shock loads in a well bore. Preferably, the transducers and instrumentation should have a construction which minimizes the effects of shock loading.

Another significant factor in pressure and temperature measurements is the fact that a temperature change can occur while a tool is in a downhole well situation. Because there is a temperature response lag factor involved in equalizing temperature, the pressure recording obtained while a transducer is equalizing temperature can be inaccurate until the transducer stabilizes at the changed temperature. Thus, there can be a time span of inaccuracy in the pressure measurements while a temperature stabilization process occurs.

In a typical oil field production test of temperature and pressure, the tool is lowered typically on an electrical wire line, slick line or tubing into the well bore and the tool is used to sense pressure and temperature data over a period of time. This data as collected over the period of time is either read out at the surface or retained in a downhole memory for subsequent analysis of pressure as a function of time and of temperature as a function of time.

In a non-oil field application a transducer can be utilized for measuring force, i.e. a weight or force applied to the transducer can be measured with a high degree of accuracy. The transducer can be used for measuring pressure which produces a corresponding force.

Quartz constructed capacitance measuring devices for measuring force or pressure have been used in a number of surface applications. Typically, such applications do not parallel downhole oil well pressure and temperature conditions. Also, size and shock mounting of a transducer is not usually a factor in the design for a surface application. Finally, the accuracy of measurement by surface type of quartz tranducers, while several order of magnitude better than strain gauges, still lacks the precision desired for many applications. This is particularly true for accuracy desired for downhole temperature and pressure measurements in a well bore.

Capacitance pressure transducers utilizing quartz and metal films can be found in U.S. Pat. No. 3,952,534 (Birchall):CL 317/246
U.S. Pat. No. 4,388,688 (Bell):CL 361/283
U.S. Pat. No. 4,196,632 (Sikorra):CL 73/718

Glass frit for attachment of quartz members can be found in

U.S. Pat. No. 4,168,518 (Lee):CL 361/283

Force responsive transducers can be found in

U.S. Pat. No. 4,295,376 (Bell):CL 73/724
U.S. Pat. No. 4,382,385 (Paros):CL 73/702
U.S. Pat. No. 4,507,972 (Morita):CL 73/708

THE PRESENT INVENTION

The present invention is embodied in a force responsive sensor designed for micro displacement, and in a specific application where a force responsive transducer is coupled to a bourdon tube. The application of pressure to the bourdon tube applies a force to a quartz diaphragm member on a transducer and produces a micro flexure and displacement of the diaphragm member. The micro displacement of the quartz diaphragm member is a function of pressure in the bourdon tube and is so minute or small in relationship to the unconstrained deflection (under pressure) of the bourdon tube that the bourdon tube essentially remains in a fixed position under pressure while the diaphragm member is displaced. For this set of conditions, the micro deflection characteristics of the diaphragm member are a most entirely determined by the properties of the quartz diaphragm member and the elastic properties of the bourdon tube have no significant effect on the deflection of the quartz diaphragm member.

The present system contemplates a highly compact and miniaturized transducer which has a high degree of accuracy for measurement of a micro displacement parameter of a quartz diaphragm member in a transducer. The quartz diaphragm member is a part of an integral construction arranged so as to reject undesired thermal effects due to construction. The quartz diaphragm member has a low coefficient of expansion per degree of temperature change and thus is relatively unaffected by changes in temperature. By design of the quartz diaphragm member to permit a discrete and defined flexure below the fracture stress value for the quartz diaphragm member, the quartz diaphragm member can be subjected to relatively severe overloads without an adverse affect or breakage of the quartz diaphragm member. Small gaps between the quartz diaphragm member and a reference member are utilized to achieve high accuracy for micro displacements. The entire transducer unit is preferably mounted in a vacuum or inert atmosphere and provides a miniaturized highly accurate sensor for pressure or force which is substantially independent of temperature and diaphragm metallization stress effects.

DESCRIPTION OF THE PRESENT INVENTION

Quartz material is a well known construction material for a transducer and provides a high degree of stability, repeatability and temperature stability. In the present invention the term "quartz" is used to designate a preferred material however, other materials with similar operational characteristics can be used in practicing the present invention as will be apparent to one skilled in the art.

It should also be appreciated that the transducer illustrations in the drawings are greatly enlarged in size as the application described herein involves miniaturization and precision accuracy to obtain precision results. The specific application disclosed involves instrumentation which is sized in cross section to pass through a well tubing diameter of one to two inches and to be used in an oil well environment of pressure and temperature. The transducer must be able to survive or accommodate surface and downhole shock loads without damage add produce high pressure measurements with a high degree of accuracy over a wide range of pressures and temperatures and temperature changes occurring over a short period of time.

"Quartz" is used herein as a measurant media is a fused silica or amorphous quartz, which is less expensive than crystalline quartz. Crystalline quartz may, however, be utilized. Ceramics and glass ceramics and borosilicate glasses may also be utilized but accuracy is not as good as quartz. The term "quartz" as used herein is intended and defined to encompass that special material as well as applicable ceramics, glass ceramics or borosilicate glasses.

Symmetry of construction is used as a means to control temperature effects caused from use of dissimilar materials with dissimilar temperature coefficients. The metallizations for capacitor plates are matched on both sides of the quartz deflection or diaphragm member so that distortion of the metallizations caused by an expansion mismatch between a quartz substrata and a metal film is balanced and cancels. This also holds true for the glass bonds used on either side of the quartz deflection member and all temperature effects are also balanced on the rigid members. This approach to cancel relatively small temperature effects facilitates the accurate measurement of very small deflections.

Figure 1:
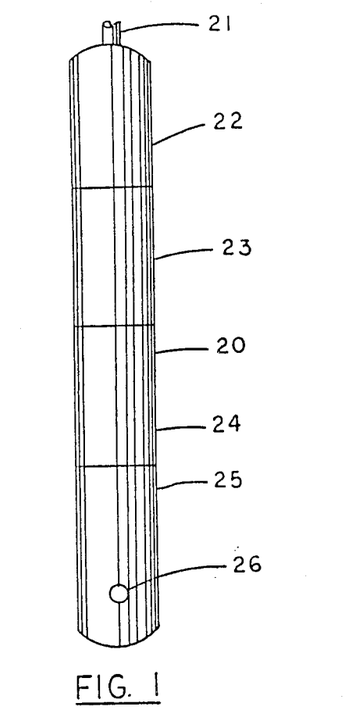
FIG. 1 is a view of a typical oil well tool for measuring temperature and pressure.

As shown in FIG. 1, a downhole cylindrically shaped, well tool 20 is sized for insertion through a small diameter well tubing and is adapted for coupling to the end of a wire line cable 21. The cable 21 extends to a surface located spooling reel or drum (not shown). The tool 20 generally includes a d.c. battery pack section 22 as a source of electrical power, an electronic section 23 with electrical circuitry for electrically processing and for providing electrical power, a temperature sensor section 24 with a temperature probe for sensing temperature and a pressure sensor section 25 with a pressure transducer for sensing pressure. An opening 26 admits fluid under pressure to the pressure sensor or transducer in the sensor section 25.

In permanent gauge installations the temperature and sensor sections are incorporated with downhole equipment for a permanent position or location in the well bore.

Figure 2:
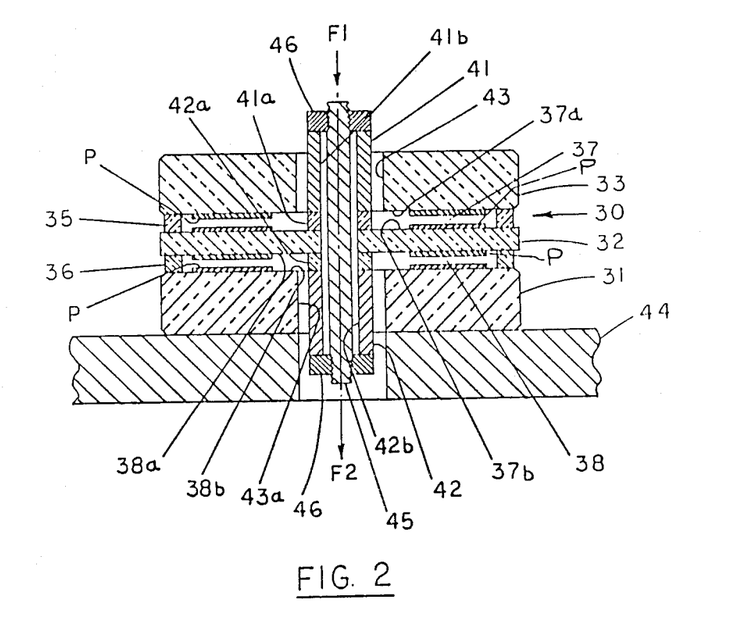
FIG. 2 is an illustration in vertical cross-section through a transducer which illustrates the principles of the present invention.

The basic principals of a transducer embodied in the present invention are schematically illustrated in FIG. 2. In FIG. 2, a transducer 30 has a first outer disk or reference member 31, an intermediate disk or deflection member 32 and a second outer disk or reference member 33 which are annular and which are constructed from quartz material. The disk members 31, 32, 33 are bonded to one another by peripherally located annular glass seals or glass frits 35, 36 to form an integral structure. The width of a frit 35 or 36 defines spacing gaps 37, 38 between disk member 32, 33 and 32, 31. Each of the facing surfaces 37a, 37b and 38a, 38b on the disk members define the gaps 37 and 38. On the surfaces 37a, 37b and 38a, 38b are facing metallized films P thereby forming electrical capacitors. The areas of the films are facing one another and the outer surface of the film is oxidized to provide electrical insulation. The film areas need not be identical. The intermediate disk member 32 has a central opening and annular surface areas about the openings are respectively bonded to upper and lower tubular quartz members 41, 42 by glass seals or frits 41a, 42a. The members 41 and 42 are symmetrically formed. A bore 41b and 42b in the tubular quartz members 41, 42 aligns with the opening in the intermediate disk 32. The members 41, 42 extend outwardly of the bores 43, 43a in the outer disk members 31, 33. A rod member 45, threaded at its ends, extends through the central bore through the assembly and nut members 46 threadedly attach to the rod member 45. The rod and nut members are used for placing the tubular members 41, 42 under compression and so that a force linkage member (not shown) can be attached to one end of the rod member without requiring the use of adhesives. Because of the very low temperature expansion coefficient of quartz, fusion of quartz to a metallic member is impractical. Attachment of a force linkage member can be a problem since adhesives tend to be dimensionally unstable. However, with the arrangement disclosed, a compression force $F_1$ can be applied to the tubular member 41 by mechanical attachment to the rod member 45. A force $F_1$ in the indicated direction would move the intermediate member 32 relative to the outer member 31 which is attached or supported on a stationary support base member 44. Alternatively, by mechanical attachment to the rod member 45 at its other end which extends through an opening in the base member 44, a tension force $F_2$ can be applied to the rod member 45 which will move the intermediate member 32 toward the outer disk member 31. In either case, the quartz intermediate disk member 32 can move toward the outer disk member 31 until it contacts the disk member 31. By proper sizing of the gap 38 relative to the strength of the intermediate disk member 32, the lower surface 38b prevents an overload force from breaking or fracturing the disk member 32. When the disk member 32 is in contact with the surface 38a, the member is in shear at the point of contact with the first disk member 3. Because of the small gap spacing between the films P and the overload feature, the outer surface of the film are oxidized to provide an outer electrical insulation layer on the film.

The foregoing described system with respect to FIG. 2 can be used in basically three types of application, i.e. where (1) pressure is applied through a bourdon tube or bellows to the rod 45 as will be explained hereinafter, or (2) a force is applied to the rod 45 by tension, or (3) a force is applied to the rod 45 by compression.

A standard approach for high accuracy pressure measurement is to measure a force exerted on a mechanical pressure sensor element while holding the physical displacement of the sensor element to zero displacement. By holding a zero displacement on a mechanical pressure sensor element, no flexture or displacement of the mechanical element is allowed and therefore there are no errors in the force measurement due to flexture of the sensor element. As a practical matter, however, "zero" displacement is not truly zero and micro inch displacements will normally occur in a sensor element although the force measurement is based on the assumption that there is no displacement of the sensor element.

For the case of a nearly perfect elastic material, such as quartz, measuring a small displacement of the material is a measurement of the force applied to the material to produce the displacement. By designing a very small capacitance gap in a capacitance sensor constructed from quartz it is possible to measure very small displacements of a thin quartz element in a variable gap capacitance arrangement. Where the quartz structure is in a monolithic or integral form, small capacitor gaps are practical and stable, and where the design is symmetrical, capacitance values are affected equally by temperature for a zero deflection condition. The use of small capacitor gaps in a quartz capacitance sensor is also important in that if full deflection of the defection element is less than that required to fracture the deflection element then the construction provides a mechanical stop which prevents breakage due to overload. Smaller sized gaps also give correspondingly higher capacitance values which allows for a smaller physical structure which can be utilized.

As illustrated with respect to FIG. 2, the structure of the transducer can be arranged to accept the sensing of either tension or compression forces. The flexture of the quartz diaphragm element 32 is limited by an overload mechanical surface stop thereby preventing breakage of the quartz member in the event of overload. The centrally protruding quartz tubular members 41, 42 are bonded to the diaphragm member 32 to eliminate any frictional effects due to the change of curvature at the center of the diaphragm member 32. No adhesive or cements need be used to mount or load the sensor elements and the sensor assembly can be clamped and backed by a base member 44 constructed of INVAR material. Thus, there are minimal thermal stresses attributable to the mounting or support of the sensor assembly. The symmetrical construction allows the temperature effects on the gaps forming the capacitors to cancel. The only remaining effect on the sensor is due to the change in the modulus of elasticity of quartz and this effect is correctable by use of temperature measurements from a temperature probe. This effect is about 90 parts per million per degree Fahrenheit.

The range of force which can be measured is easily varied by changing the diaphragm dimensions The ruggedness of the quartz transducer is greatly enhanced by placing the tubular elements 41, 42 on the disk member 32 in compression by the rod 45 and nuts 46. Metal film coatings on the facing surfaces in the gaps are used for providing measurement capacitor plates and have electrical surface insulation. The capacitors can be electrically grounded to outside metal members so that outside stray capacitance effects are controlled. The shape of the quartz disks is preferably circular rather than rectangular to provide the same resistance to deflections in all directions. This is because a load applied at a slight angle with respect to the load axis .on a rectangular shape can cause a problem of twisting of the sensing beam of the sensing element. A circular construction provides a uniform resistance to twisting moments of deflection in all directions. A long rectangular section provides a low resistance to twisting deflections. Thus, a circular shape provides equal resistance deflection in all directions and thus tends to respond accurately to a load that is not exactly perpendicular to the diaphragm element. The resulting moment is also rejected by the symmetry of construction in that it produces a deflection in the diaphragm that tends to be equally positive and negative on each side and thus leave the capacitance readings unaffected.

By way of background explanation, bourdon tubes have been widely used as a means for transmitting force to a measuring device. A Bourdon tube is generally described as a curved tube member constructed of metal which has an oval or flattened cross-section. When a pressure differential occurs, i.e., the internal pressure within the tube member is greater than the pressure exterior of the tube members, the pressure tends to move the oval configuration toward a circular configuration with a resultant effect on the wall of the tube member to cause the tube member to uncurl or move toward a straight line or unrestricted condition. By attaching a transducer to a closed end of the bourdon tube, the movement can be translated into a function of the applied pressure. The force produced by the Bourdon tube is also a function of the pressure. The problem with bourdon tubes is accuracy, i.e., a number of measurements taken for a given pressure can vary in a magnitude because hysteresis, imperfect elasticity and temperature seriously affect the measurement values. In a measurement device which is calibrated against known pressure or force inputs, subsequent measurements will not be accurate if hysteresis is not predictable, the elasticity is non-repeatable and the temperature effects are not controlled. As an example assume a given pressure is applied to a bourdon tube which produces a force causing an unrestrained deflection of 0.0300 inches. For the same force, a quartz member can have a deflection of 0.0001 inches. When the quartz and bourdon tube are interconnected, for the given pressure the bourdon tube deflection is 1/300 of what it would ordinarily be if it was not connected to the quartz. Because the bourdon tube has virtually no movement under these conditions, there is significantly lower stress in the bourdon tube which means greater mechanical stability. Because the bourdon tube is formed in a loop, expansion due to temperature is not a significant factor, while quartz has predictable temperature characteristics.

Figure 3:
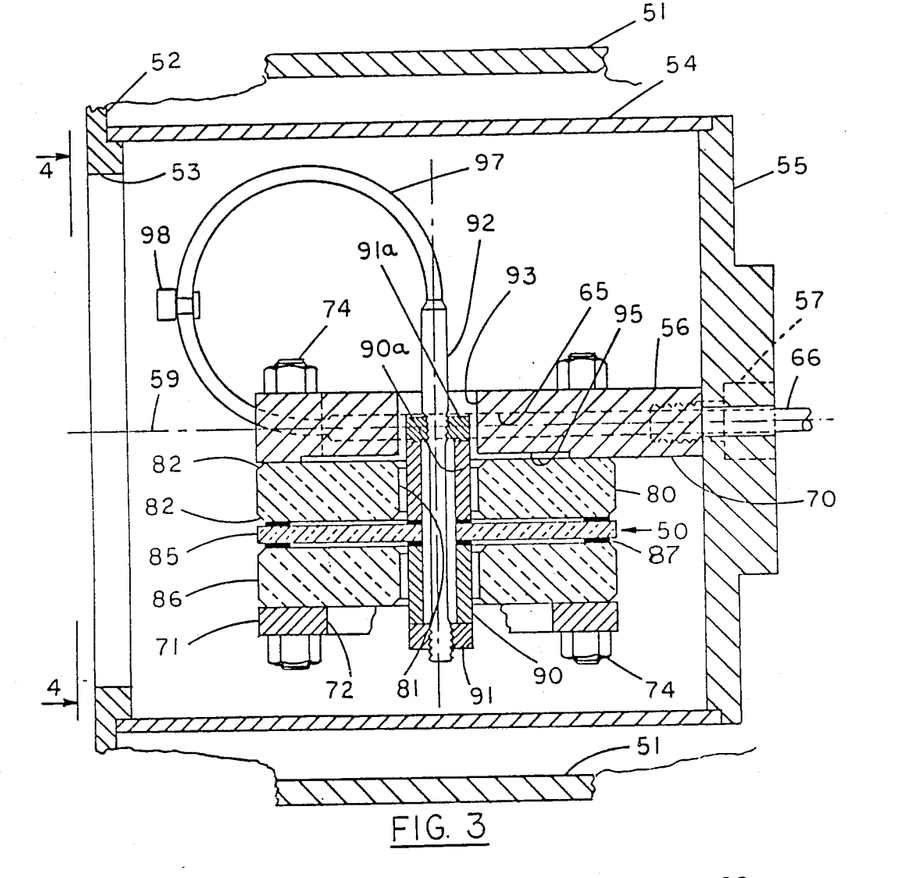
FIG. 3 is an illustration in cross-section through a transducer and bourdon tube and embodying the present invention.

Referring now to FIG. 3, a transducer assembly 50 is shown disposed within a metal tubular housing 51 (shown partially). The housing 51 has a transverse annular bulkhead 52 with a central access opening 53 for electrical connecting wires. A tubular isolation metal housing 54 extends between the bulkhead 52 and a cylindrically shaped, metal end closure cap member 55. The closure cap member 55 forms a base for a rectangularly shaped and elongated base member 56 which is constructed of INVAR plate material. The base member 56 is attached by screw members (not shown) to a flat surface on the cap member 55. The base member 56 lies along a central axis 59 of the isolation housing 54.

Figure 4:
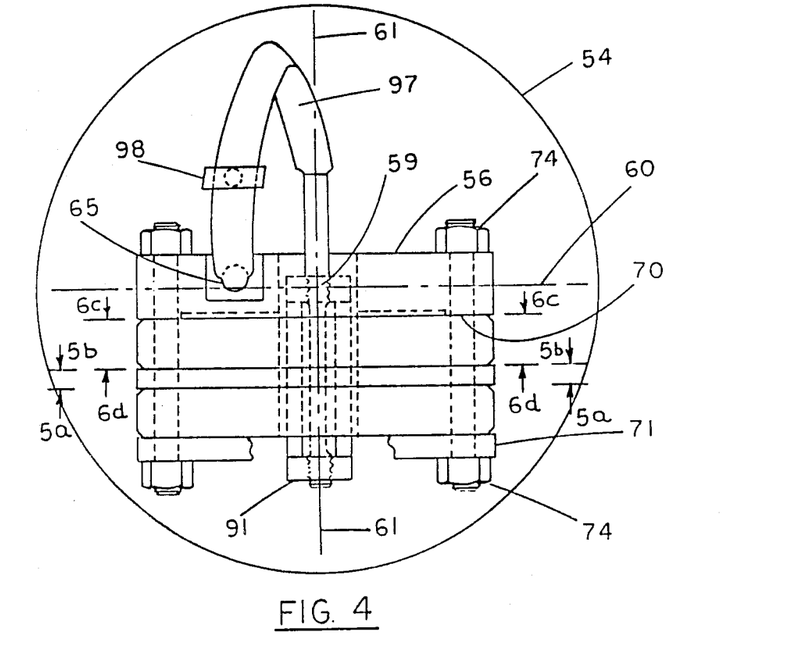
FIG. 4 is a view taken along line 4—4 of FIG. 3.

As can be seen from FIG. 4, transverse perpendicular planes 60, 61 bisect the base member 56 and have a common intersection located along the axis 59. To one side of the plane 61 and located on the transverse plane 60 is a passageway 65 for a tubing 66 which extends for the length of the base member 56. One end of the tubing 66 extends to a pressure port in the tool.

Referring back to FIG. 3, the cylindrically shaped transducer assembly 50 is disposed on one side surface 70 of the base member 56. The cylindrically shaped transducer assembly 50 is held in position on the base member 56 by an rectangularly shaped outer clamp member 71, which has a cylindrically shaped opening 72. At the respective corners of the outer clamp member 71 are openings which align with openings through the base member 56 so that four nuts and bolts 74 can be used to attach the transducer assembly 50 to the surface 70 of the base member 56 and to place the peripheral area of the assembly which is outside of the opening 72 under compression. With the outer peripheral portions of the transducer assembly 50 under compression, the inner central portions of the transducer assembly are not significantly stressed. The base member 56 as well as the nuts and bolts 74 are constructed from INVAR material. INVAR has a temperature coefficient of expansion close to the temperature coefficient of expansion of quartz.

The transducer assembly 50 consists of a first annular disk member 80 constructed of quartz and provided with a central opening 81 and beveled outer edges 82, the bevels being 45°; an intermediate annular disk member 85 constructed of quartz; and a second annular disk member 86 constructed of quartz and which is also beveled on its outer edges. The purpose of a bevel is to permit thick film conductors to be applied and overlap a thin film for electrical take-out purpose. A wire can be easily attached to a thick film. The first and second disk members 80, 86 of the transducer assembly 50 are attached by bonding to the intermediate annular disk member or diaphragm member 86 by annular glass seals or frits around the outer periphery of the disk members. The entire assembly 50 is an integral structure and, by selection of the dimensions of the glass seals, provides a small spacing gap between the intermediate annular disk member 85 and each of the first and second disk members 80, 86. Tubular boss members 90, 90a constructed from quartz are bonded by glass seals to the intermediate annular disk 85. At the outer end of the tubular boss members 90, 90a and external to the annular members 80, 86, are INVAR cap members 91, 91a which have threaded bores. The threaded bores, in this instance, are used to receive the threaded ends of a coupling rod member 92 (of INVAR) which extends through the bore of the tubular members 90, 90a, the intermediate disk member 85 and the base member 80 as well as a bore 93 in the base member 56. Between the base member 56 and the annular member 80 is a circular recessed spacing groove 95 for stress relief purposes. The coupling rod member 92 acts as a force transmittal member and is connected by welding to the closed end of a bourdon tube member 97 which has been flattened in cross-section and extends in a cylindrical curvature to the upper opening of the bore in the base member 56. A counter balance 98 which is selectively movable along the tube member 97 provides for mechanical balancing as necessary. The exterior of tube member 97 is in a vacuum atmosphere while the interior is at the test pressure. Thus, there is a pressure differential across the tube member 97. The tube member is constructed from INCONEL-X, a nickel alloy.

The quartz members 80, 86 are made substantially more rigid than the quartz diaphragm 85. As an example, the members 80, 86 were constructed with a factor of 125 times more rigidity than the rigidity of the diaphragm 85. As the diaphragm 85 flexes under a force applied through the rod member 92, the capacitance of capacitors formed by plate members on facing surfaces of the members 85, 80 and 86 varies as a precise function of the applied force.

Figure 5A:
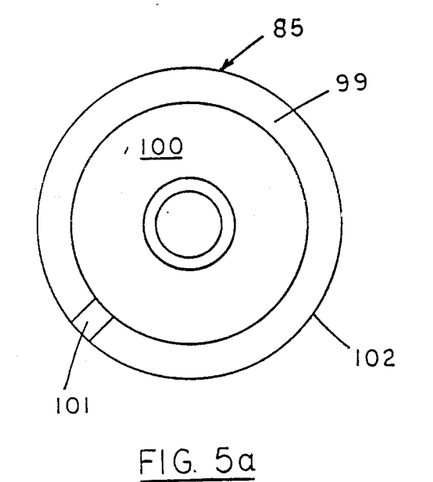
FIG. 5a is a view taken along line 5a—5a of FIG. 4.
Figure 5B:
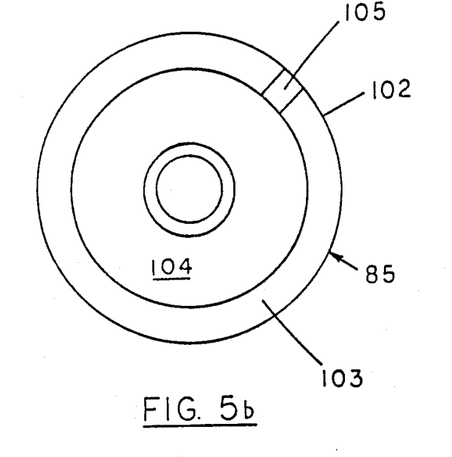
FIG. 5b is a view taken along line 5b—5b of FIG. 4.

Referring now to FIGS. 5A & 5B, the intermediate diaphragm member 85 is illustrated. The thickness of the diaphragm is 0.020 inches and the surface of the quartz diaphragm member is preferably mechanically or chemically polished to reduce surface imperfections which affect the ultimate strength of the diaphragm member. On a top surface 99 of the diaphragm member 85 is an annular metal film coating 100 (applied by metallization or sputtering). The film coating 100 has a tab extension 101 extending radially outward of the outer cylindrical edge of the coating 100 and extending over an outer edge to a side surface 102. The tab permits the connection with a thick film conductor. The bottom surface 103 of the member 85 has an annular metal film coating 104. The film coating 104 has a tab extension 105 extending radially outward of the outer cylindrical edge of the coating 104 and extending over an outer edge to the side surface 102. The tab extensions 101 and 105 are angularly disposed relative to one another (an angle of 180°) so that the tab extensions do not electrically short and can respectively be attached to a thick film conductor (not shown).

Figure 5C:
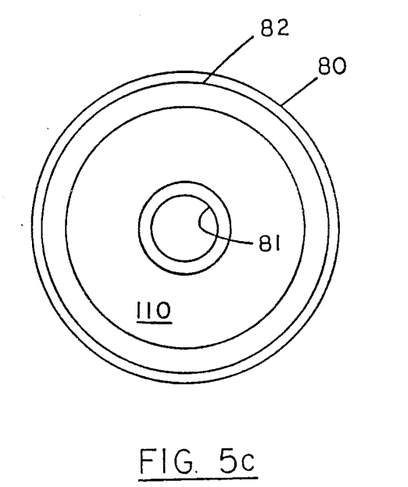
FIG. 5c is a view taken along line 5c—5c of FIG. 4.
Figure 5D:
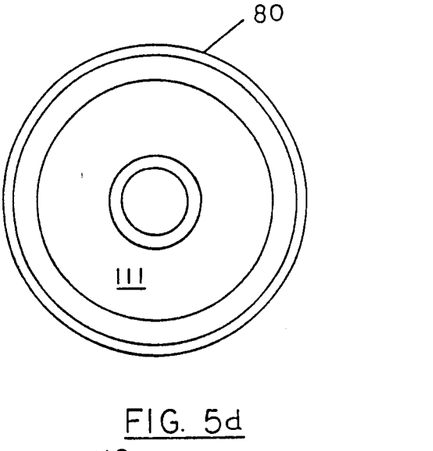
FIG. 5d is a view taken along line 5d—5d of FIG. 4.
Figure 5E:
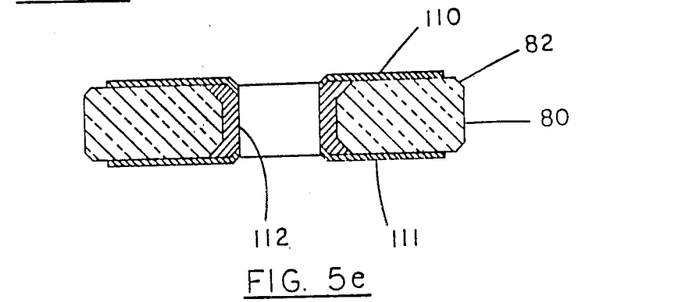
FIG. 5e is a view in cross-section of a reference member 80.

The first and second members 80 and 86 are 0.100 inches thick and are identically constructed. As shown in FIGS. 5c—5e, a member 80 has annular upper and lower surface metal film coatings 110, 111, which are $12 \times 10^{-6}$ inches thick. The bore 81 has a thick film metal coating 112 which electrically connects the surface film coatings 110, 111. When a film coating 110 and 111 is in contact with the clamp member 71 or the plate member 56, an electrical ground is established.

The present invention, as set forth herein, is a unique application because the measurement displacement involved in the quartz intermediate member 85 is calibrated to measure with a micro displacement between 0 to $100\times10^{-6}$ inches. However, should an excessive pressure occur, even though a maximum displacement occurs, the intermediate member 85 bottoms out on a base member by moving a small distance of the gap so that the intermediate member 85 can not be overloaded and break. Thus, the transducer assembly has a built-in overload protection.

The film coatings 110, 111, 104, 100 are formed by sputtering a beta tantalum film and oxidizing at least one facing outer surface to provide a controlled thickness of electrical insulation. Thus, a tantalum oxide surface layer provides a high electrical dielectric. Tantalum adheres well to quartz and will not peel off readily. Thus, if a particle of matter should intrude in the gap between the film coatings, the capacitor will not be electrically shorted out.

The foregoing disclosure and description of the invention are illustrative and explanatory thereof, and various changes in the size, shape and materials, as well as in the details of the illustrated construction may be made without departing from the spirit of the invention.

Figure 6:
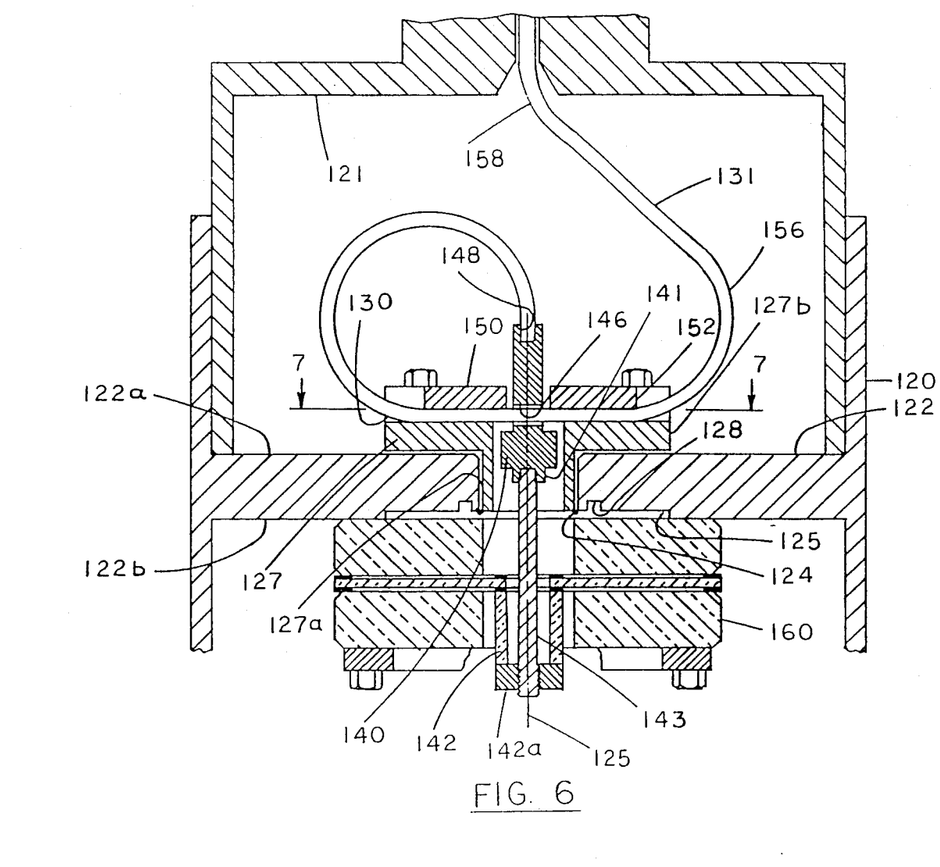
FIG. 6 is a cross-section through another embodiment of the present invention.
Figure 7:
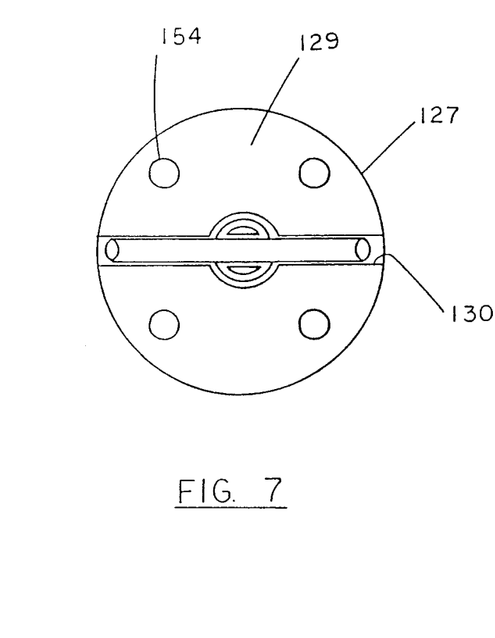
FIG. 7 is a view taken along line line 7—7 of FIG. 6.

Referring now to FIGS. 6 and 7, a preferred form of the present invention is illustrated where a tubular housing 120 constructed of INVAR has spaced apart transverse bulkheads 121, 122. Bulkhead 122 is constructed of INVAR, while bulkhead 121 can be constructed from stainless steel. Bulkhead 122 is a part of the housing 120 while the bulkhead 121 is slidably received and positioned in the housing 120. The bulkhead 122 has one surface 122a with a central cylindrically formed opening 124 about a central axis 125 and an opposite surface 122b with a central cylindrically formed recess 125. A tubular base support 27 has a tubular section 127a received in the opening 124 where the tubular section in the opening 124 has a lesser diameter relative to the opening 124 to provide an annular gap. The tubular section in the opening 124 is centered and electron beam welded for rigid attachment to the bulkhead 122. An enlarged tubular section 127b has its lower surface spaced from the surface 122a to provide a horizontal gap. The horizontal and annular gaps isolate the base support 127 from the bulkhead 122 so that the different expansion of the support 127 and the bulkhead 122 is accommodated without producing stress. This permits the material of the member 127b to be the same as the material of the bourdon tube 131 and so that thermal stresses are only produced at the electron bonded junction. In the upper surface 129 of the base support 127 is a diametrically extending, rectangularly shaped groove 130. The groove is shaped to receive a flattened section of a bourdon tube 131. In the recess 125 an annular stress relief groove 128 is located about the opening 124. A force linkage member 140 is cylindrically shaped and sized for loose reception in the bore of the base support 127. At one end of the linkage member 140 is a stud projection 141 which has a threaded bore to receive a compression rod member 143. Intermediate the length of the linkage member 140 is a transverse bore 146 through which the flattened tube 131 can be passed. At the other end of the linkage member 140 is a bore 148 which receives the closed end of the flattened tubing member 131. The tubing member 131 is attached to the linkage member by welding. Between bore 148 and the groove 130, the flattened tube is arcuately curved to form the typical bourdon tube construction. The depth of the groove 130 and the size of the tube 131 is such that a portion of the tube 13 extends outwardly of the groove 130. A cover plate 150 is attached to the base support 127 and has an opening to access the other end of the linkage member 140 to the tube 131. The cover plate 150 has diametrically arranged recesses 152 which accommodate curvature of the tube 131. In the base support 127 are threaded bores 154 and bolts extending through aligned openings in the cover plate 150 attach the cover plate to the base support and firmly clamp the tube 131 in the groove 130. The tubing 131 is curved at 156 and at 158 to provide exit of the tube 131 along a central axis to the source of pressure to be measured.

The sensing transducer 60 which is attached to the bulkhead 122 by nuts and bolts is constructed as shown in FIG. 3 and FIG. 4 except that only one tube member 142 is utilized and attached to the diaphragm member. The nut 142a is tightened on the rod 143 to apply tension. The size of the bore 146 is such that the rod 125 under tension does not engage the tube 131. The features of the embodiment of FIG. 6 include simplicity of construction and high rigidity to avoid shock damage.

It will be apparent to those skilled in the art that various changes may be made in the invention without departing from the spirit and scope thereof and therefore the invention is not limited by that which is enclosed in the drawings and specifications but only as indicated in the appended claims.

I claim:

1. A capacitance transducer having means for providing a capacitance measurement indicative of applied force, comprising a first outer member constructed from quartz and having an annular configuration and having parallel upper and lower surfaces, an intermediate member constructed from quartz and having an annular configuration and having parallel upper and lower surfaces, a second outer member constructed from quartz and being an annular configuration and having parallel upper and lower surfaces, said outer members being symmetrical in construction and having a thickness relative to the thickness of the intermediate member to provide a rigidity substantially greater than the rigidity of the intermediate member, annular bonding means disposed between an outer member and the intermediate member for attaching said members to one another and for defining gaps between facing surfaces of an outer member and the intermediate member, metallized electrically conductive film in a facing relationship on said surfaces and at least one film having an outer oxidized layer for providing electrical insulation and a metallized interior layer for providing an electrical capacitor plate, a first tubular member for coupling of said intermediate member to an external force applying member, said first tubular member being constructed from quartz and having a bore sized to align with the opening in the intermediate member and having an outer diameter sized to pass through an opening in an outer member, and annular bonding means disposed between said first tubular member and said intermediate member for attaching said first tubular member to said intermediate member.

2. The transducer as set forth in claim 1 wherein said gaps are dimensionally related to the rigidity of an intermediate member whereby an intermediate member may be flexed to contact a facing surface on an outer member without fracturing the intermediate member.

3. The transducer as set forth in claim 1 and further including a second tubular member constructed from quartz and having a bore size to align with the opening in the intermediate member and an outer diameter sized to pass through an opening the other outer member, and
annular bonding means disposed between said second tubular quartz member and said intermediate member for attaching said second tubular member to said intermediate member;
said first and second tubular members being symmetrically formed and centrally attached to the outer surfaces of said intermediate member.

4. The transducer as set forth in claim 3 and further including force coupling means comprised of a metal rod member extending through the bore of said outer members and said intermediate member, flange members on said rod member for applying a compression force to said first and second tubular members, said metal rod member permitting coupling to an external force member.

5. The transducer as set forth in claim 4 wherein said rod member and flange members are constructed from INVAR.

6. The transducer as set forth in claim 1 and further including
a base support member for providing a reference support for one of said outer members;
clamping means for engaging the periphery of the other outer member and for attaching the transducer to the base support member under compression applied peripherally of said intermediate member.

7. The transducer as set forth in claim 6 and further including
an annular recess in said base support member aligned behind said one outer member and in alignment with said clamping means whereby the central portion of said transducer is isolated from clamping forces on the transducer.

8. A capacitance transducer having means for providing a capacitance measurement indicative of applied force, comprising
a first outer member constructed from quartz and having parallel upper and lower surfaces,
an intermediate member constructed from quartz and having parallel upper and lower surfaces.
a second outer member constructed from quartz and having parallel upper and lower surfaces,
said outer members having a thickness relative to the thickness of the intermediate member to provide a rigidity substantially greater than the rigidity of the intermediate member,
bonding means disposed between an outer member and the intermediate member for attaching said members to one another and for defining gaps between facing surfaces of an outer member and the intermediate member,
metallized electrically conductive films in a facing relationship on said surfaces and at least one film having an outer oxidized layer for providing electrical insulation and a metallized interior layer for providing an electrical capacitor plate,
a first extension member constructed from quartz and having sufficient length so as to pass through an opening in an outer member for coupling to an applied force member, and
bonding means disposed between said first extension member and said intermediate member for attaching said first extension member to said intermediate member so that a tension or compression force can be applied to said intermediate member for developing a micro displacement of said intermediate member.

9. The transducer as set forth in claim 8 wherein said gaps are dimensionally related to the rigidity of the intermediate member whereby the intermediate member may be flexed to contact a facing surface on an outer member without fracturing the intermediate member.

10. The transducer as set forth in claim 8 and further including a second extension member constructed from quartz sized to pass through an opening the other outer member, and
bonding means disposed between said second extension member and said intermediate member for attaching said second extension member to said intermediate member;
said first and second extension members being centrally attached to the outer surfaces of said intermediate member.

11. The transducer as set forth in claim 10 and further including force coupling means comprised of a metal rod member extending through a bore in said outer extension members and said intermediate member and flange members on said rod member for applying a compression force to said first and second extension members, said metal rod member permitting coupling to an external force member.

12. The transducer as set forth in claim 11 wherein said rod member and flange members are constructed from INVAR material.

13. The transducer as set forth in claim 8 and further including
a base support member for providing a reference support for one of said outer members;
clamping means for engaging the periphery of the other outer member and for attaching the transducer to the base support member under compression applied to said transducer peripherally of said intermediate member.

14. The transducer as set forth in claim 13 and further including
an annular recess in said base support member aligned behind said one outer member and in alignment with said clamping means whereby the central portion of said transducer is isolated from clamping forces on the transducer.

* * * * *